United States Patent
Khandelwal et al.

(10) Patent No.: US 7,444,325 B2
(45) Date of Patent: Oct. 28, 2008

(54) METHOD AND SYSTEM FOR INFORMATION EXTRACTION

(75) Inventors: Shashikant Khandelwal, Palo Alto, CA (US); Alex Meyer, Palo Alto, CA (US); Ranjit Padmanabhan, Palo Alto, CA (US); Dhiraj Pardasani, Palo Alto, CA (US); Vinay Kakade, Mountain View, CA (US)

(73) Assignee: IM2, Inc., Palo Alto, CA (US)

( * ) Notice: Subject to any disclaimer, the term of this patent is extended or adjusted under 35 U.S.C. 154(b) by 294 days.

(21) Appl. No.: 11/113,568

(22) Filed: Apr. 25, 2005

(65) Prior Publication Data
US 2006/0161531 A1    Jul. 20, 2006

Related U.S. Application Data (60) Provisional application No. 60/643,924, filed on Jan. 14, 2005, provisional application No. 60/643,948, filed on Jan. 14, 2005.

(51) Int. Cl.
*G06F 7/00*    (2006.01)
(52) U.S. Cl. .......................................................... 707/3
(58) Field of Classification Search ................ 707/1, 707/100; 700/247; 706/11; 704/7
See application file for complete search history.

(56) References Cited

U.S. PATENT DOCUMENTS

| | | | | |
|---|---|---|---|---|
| 5,926,812 A | * | 7/1999 | Hilsenrath et al. | 707/5 |
| 6,189,002 B1 | * | 2/2001 | Roitblat | 707/1 |
| 2001/0042083 A1 | * | 11/2001 | Saito et al. | 707/517 |
| 2003/0055816 A1 | * | 3/2003 | Paine et al. | 707/3 |
| 2005/0171932 A1 | * | 8/2005 | Nandhra | 707/3 |

OTHER PUBLICATIONS

E. Milios, Y. Zhang, B. He, L. Dong: "Automatic Term Extraction and Document Similarity in Special Text Corpora", Proceedings of the 6th Conference of the Pacific Association for Computational Linguistics (PACLing'03), Halifax, Nova Scotia, Canada, Aug. 22-25, 2003, pp. 275-284.*

* cited by examiner

*Primary Examiner*—Cheyne D Ly
(74) *Attorney, Agent, or Firm*—William L. Botjer (57) ABSTRACT

A present invention provides a method and a system for extracting information related to a pre-defined context from data sets written in semi-structured or unstructured form, such as a natural language text. The information related to the pre-defined context is stored in an information store in accordance with a pre-defined structural arrangement. Further, the individual data values in the extracted information are assigned weights depending on their relevance to attributes of the predefined context. The operation of assigning weights to the structured information provides a measure for comparing the relevance of a plurality of structurally arranged information to the attributes of the pre-defined context.

13 Claims, 11 Drawing Sheets

METHOD AND SYSTEM FOR INFORMATION EXTRACTION

REFERENCE TO RELATED APPLICATIONS

This patent application claims priority of U.S. Provisional Patent Application No. 60/643,924 filed on Jan. 14, 2005

This patent application hereby incorporates by reference U.S. Provisional Patent Application No. 60/643,948 filed on Jan. 14, 2005, titled "Method and system to identify records that relate to a pre-defined context in a data set".

BACKGROUND

The present invention relates to the field of information processing systems. More specifically, the present invention relates to the field of extracting information from natural language data and re-arranging it in a structural form.

The present age is witnessing the generation of large amounts of information. The sources of information such as the Internet store information in different forms. There is no common syntax or form of representing the information. Therefore, there is a need of information search techniques that can help in extracting relevant information from volumes of unstructured information available at different sources of information.

Different information search techniques are known in the art. One such technique is keyword search. In keyword search, keywords that relate to a particular information domain are used to conduct search in the information sources.

Another methodology is wrapper induction search. It is a procedure designed to extract information from the information sources using pre-defined templates. Instead of reading the text at the sentence level, wrapper induction systems identify relevant content based on the textual qualities that surround the desired data. For example, a job application form may contain pre-defined templates for various fields such as name, age, qualification, etc. The wrappers, therefore, can easily extract information pertaining to these fields without reading the text on the sentence level.

Yet another methodology for extracting information is an information index system that creates a database by extracting attributes from a plurality of structurally similar texts.

However, the above-mentioned techniques suffer from one or more of the following limitations. The keyword search techniques generally produce inadequate search results. These techniques do not recognize the context in which a particular searched keyword has appeared. For example, if a user inputs the name of the artist and is looking for the artist's upcoming concerts, the technique may also generate results that may be related to the personal life of the artist. This type of information will be irrelevant for a person who is looking for tickets to the artist's show. Therefore, many non-relevant data sets also get displayed in the search results.

Further, the conventional techniques fail to incorporate the synonyms and connotations of the keywords that are rife in natural language content. For example, one of the keywords that can be used for an upcoming concert's tickets is 'concert'. The conventional techniques do not incorporate the synonyms, such as show, program, performance etc.

Wrapper induction technique faces limitations because of the lack of common structural features across varied information sources. Information index system techniques find specific use in extracting information from texts that have a pre-defined structural form. The techniques discussed above do not re-structure the information in any way to highlight the context, and circumvent the nuances and complexities of language.

In light of the above limitations, there exists a need for an information extraction methodology that identifies relevant content by identifying the presence of associated attributes that relate to an information domain. Further, there is a need for a methodology that extracts relevant information from a data set and restructures it in a common structural form.

SUMMARY

An object of the present invention is to provide a method and system that can extract information related to a pre-defined context from a data set, and convert the information from natural language to a pre-defined structural form.

Yet another object of the present invention is to facilitate the comparison of information sets which are represented in structural arrangement.

In accordance with one object, the present invention provides a method for extracting information relevant to a pre-defined context. The method comprises three steps. In the first step, a relevant data set with respect to the pre-defined context is identified. In the second step, the information relevant to the pre-defined context is identified in the relevant data set. In the third step, the relevant information is extracted from the relevant data set.

In accordance with another object, the present invention provides a system for extracting information relevant to a pre-defined context. The system comprises three system elements—a data set classifier, an information identifier and an entity extractor. The data set classifier identifies a relevant data set with respect to the pre-defined context. The information identifier identifies information relevant to the pre-defined context in the relevant data set. The entity extractor extracts the relevant information from the relevant data set.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

For convenience, the terms used to describe the various embodiments are defined below. It should be noted that these definitions are provided to merely aid the understanding of the description, and that they in no way limit the scope of the invention.

Knowledge domain: A knowledge domain includes data pertaining to a specific field or domain.

Pre-defined context: The pre-defined context defines the objective, for which information is to be extracted. For example, a pre-defined context may include the online purchase of shoes. In this case, information like shoe size, brand, price etc., will constitute the information that is relevant to the pre-defined context.

Attributes: Attributes are the characteristics that define a knowledge domain. For example, in the knowledge domain of online purchase of concert tickets, the attributes are the name the artist, location of the concert, price of tickets, date of the concert etc.

Directed acyclic graph: A directed acyclic graph (DAG) is a representation of a set of items, each of which is associated with a node of the graph. All nodes of a directed acyclic graph are connected by edges or logical connections which are unidirectional (i.e. directed) in nature. Further, a route traced along connected edges, in the direction specified by the edges, never ends on a node from which the route starts (i.e. acyclicity).

Ancestor nodes: In a tree structure representation of data, for any given node, ancestor nodes include the nodes that fall on a path traversed from the root node of the tree structure to the given node. Root node is always included in the set of ancestor nodes.

Descendent nodes: In a tree structure representation of data, for a given node, descendent nodes include the nodes that fall on a path traversed from the given node to all leaf-nodes connected to the given node. All leaf-nodes connected to the given node are included in the set of descendent nodes.

The present invention relates to the field of searching pertinent information in a data set. More specifically, the present invention relates to the extraction of information, which is related to a pre-defined context, from a data set. The pre-defined context defines the objective, for which information is to be extracted. For example, a pre-defined context may include online shopping for shoes, and the like. Further, any pre-defined context will be defined by certain attributes, which define the information that will be relevant to the pre-defined context. For example, in the case of online purchase of shoes, these attributes will include shoe brand, model number, shoe price, shoe size, and shoe color.

Figure 1:
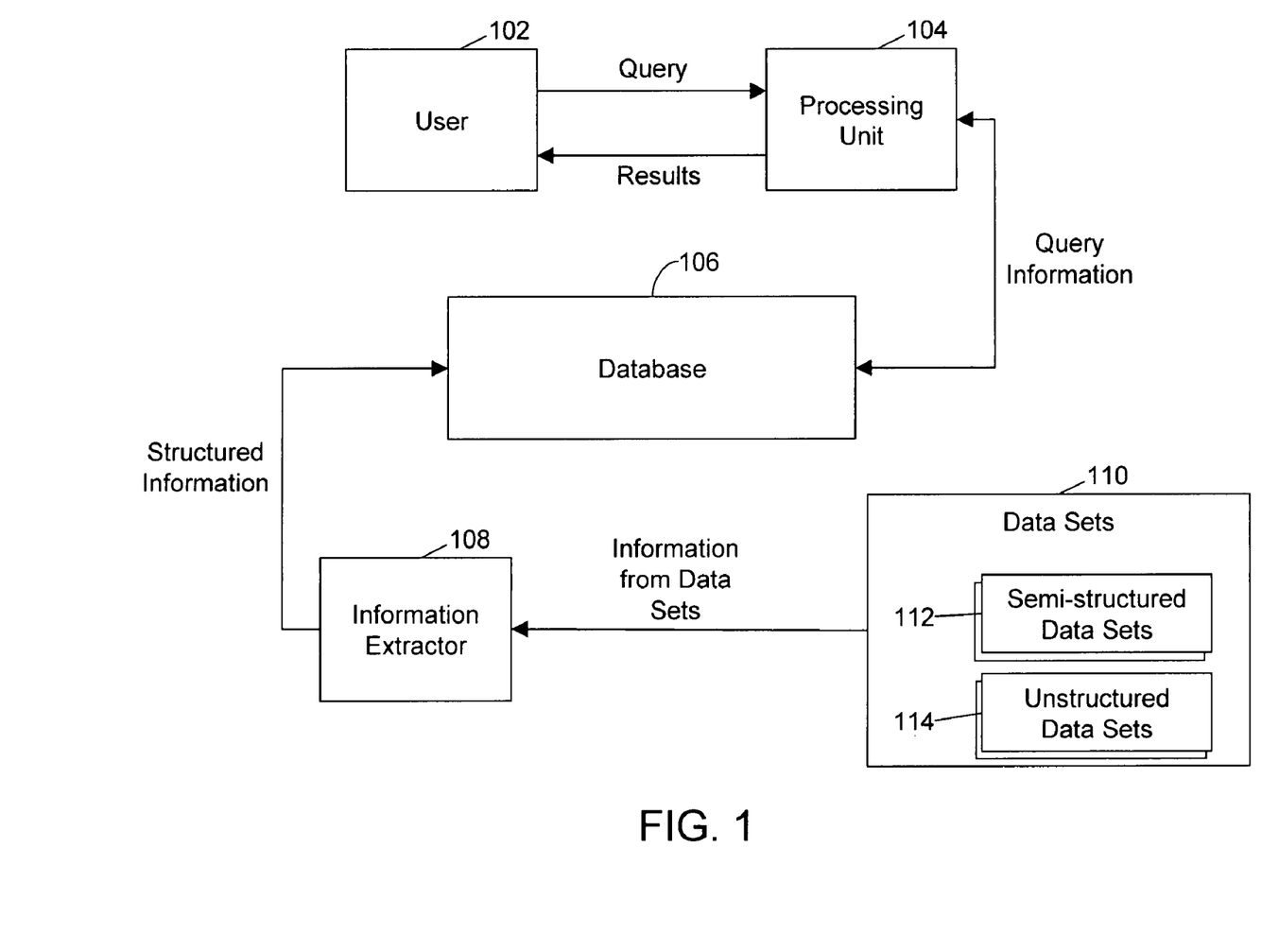
FIG. 1 is a block diagram illustrating the environment of the present invention, in accordance with one embodiment of the present invention.

FIG. 1 is a block diagram illustrating the environment of the present invention, in accordance with one embodiment of the present invention. A user 102 specifies a query, which is passed to a processing unit 104. User 102 can be an entity such as a human or a computer. Processing unit 104 processes the query by searching for information corresponding to the query in database 106. An information extractor 108 processes data sets 110 to extract information that is pertinent to a pre-defined context. This information is then stored in database 106.

The pre-defined context is any knowledge domain related to which information is to be extracted. A few examples of the knowledge domain include knowledge domains pertaining to information regarding online purchase of concert tickets, electronics, shoes, and the like. As discussed earlier, the pre-defined context is defined by certain attributes. Data set 110 may be in the form of a text document, a webpage, a newspaper advertisement in digital form, or any other source of information.

Information extractor 108 scans a plurality of data sets 110 for information related to the pre-defined context. On identifying relevant information in data set 110, information extractor 108 extracts the relevant information and saves the information in a pre-defined data structure in database 106. The pre-defined data structure is a structural arrangement that defines the relationships that exist between the attributes corresponding to the pre-defined context. Data sets 10 comprise semi-structured data sets 112 and unstructured data sets 114. Data in semi-structured data sets 112 is stored in a semi-structured format. The semi-structured format is a format, in which the arrangement of data is in accordance with a pre-defined data structure. Data in unstructured data sets 114 is stored in an unstructured format. The unstructured format is a format in which the arrangement of data is not in accordance with any pre-defined rule.

Figure 2:
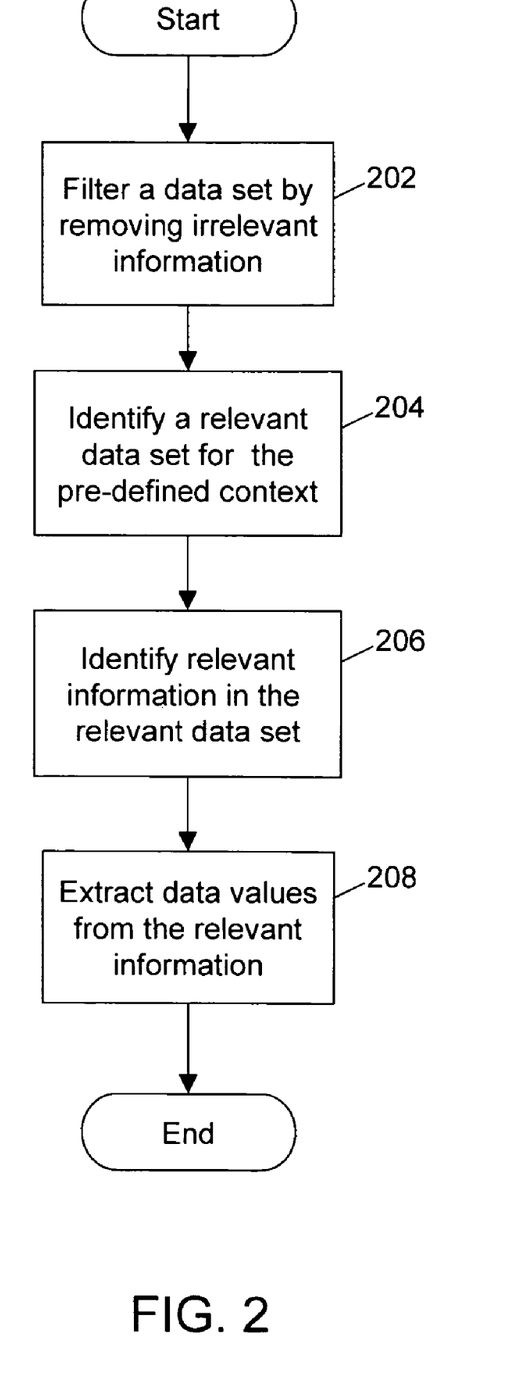
FIG. 2 is a flowchart illustrating the method for extracting information, which relates to a pre-defined context, from a semi-structured data set.

FIG. 2 is a flowchart illustrating the method for extracting information, which is related to a pre-defined context, from a semi-structured data set 110. The process of extracting information primarily comprises four steps. At step 202, data set 110 is filtered to remove irrelevant information using pre-defined templates. For example, while shopping online, a person would not be interested in the copyright information that is found in webpagescontaining information about the articles available for sale. Hence, such information can be used from these webpages. In this example, the pre-defined template will be the rule that defines the identification of copyright information in the webpage. For instance, the rule would define that the copyright information can be identified by looking for the text following the character © in the footer of the page. Hence, by following such a rule, the irrelevant information (in this case, the copyright information) can be removed before processing the webpage further. The removal of irrelevant information helps to increase the proportion of relevant information in data set 110. The method of filtering data set 110 is explained in further detail in conjunction with FIG. 3.

At step 204, data set 110 is classified as relevant or irrelevant to the pre-defined context. The method of classifying data set 110 as relevant is explained in further detail in conjunction with FIG. 4.

At step 206, the information relevant to the pre-defined context is identified in the relevant data set 110. At step 208, the relevant information in relevant data set 110 is extracted. The steps 206 and 208 are discussed in detail in conjunction with FIGS. 5 and 6.

Figure 3:
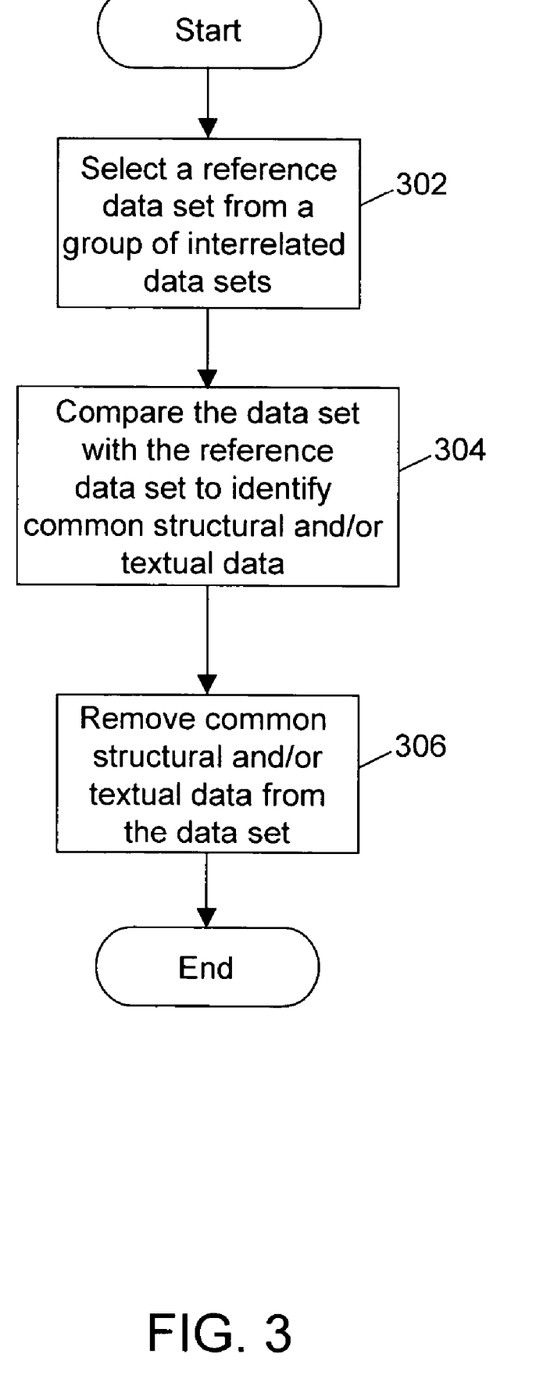
FIG. 3 is a flowchart illustrating the step of filtering the data set, in accordance with one embodiment of the present invention.

FIG. 3 is a flowchart that illustrates the step of filtering data set 110, in accordance with one embodiment of the present invention. At step 302, a reference data set is selected. The reference data set is a data set that contains structural and/or textual data that is common across a group of interrelated data sets. The interrelated data sets are the data sets that contain information about a single knowledge domain, such as the tickets domain. The reference data set is selected in order to remove the structural and/or textual data that can be identified as extraneous to the pre-defined context without reading their content. For example, in the case of online shopping where data sets 110 are web pages that offer articles for sale, the structural and/or textual data can be the navigation panels contained in the webpages.

At step 304, data set 110 is compared with the reference data set. Based on this comparison, common structural and/or textual data between data set 110 and the reference data set are identified. At step 306, the common structural and/or textual data, such as the navigation panel in a web page, is removed from data set 110. In this manner, the extraneous features are removed from data set 110. This step filters data set 110 so that only the parts of data set 110 that contain information related to the pre-defined context are retained. Data set 110, from which the common structural and/or textual data has been removed, is called a filtered data set.

Figure 4:
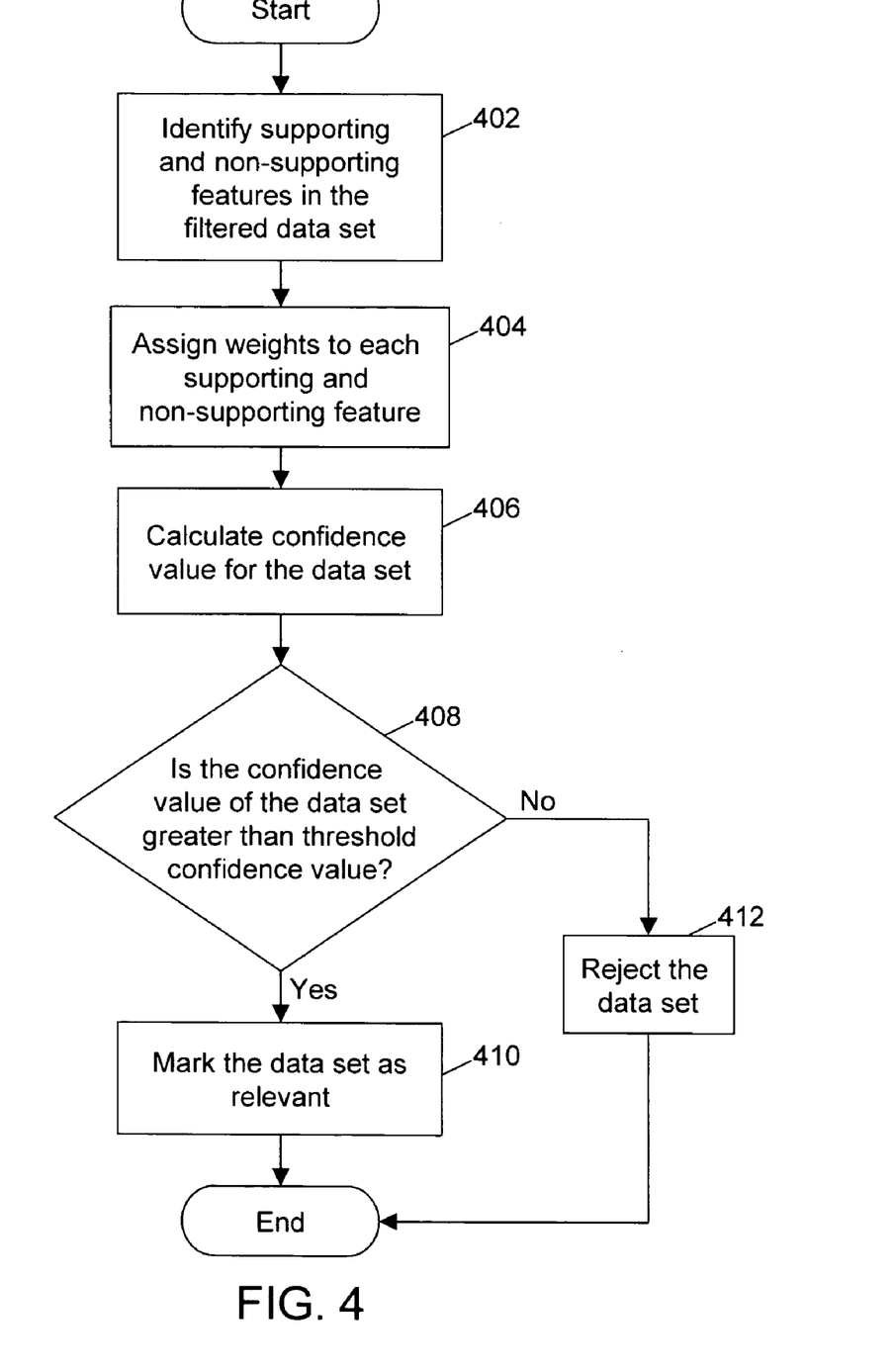
FIG. 4 is a flowchart illustrating the step of identifying a relevant data set, in accordance with one embodiment of the present invention.

FIG. 4 is a flowchart illustrating the step of identifying a relevant data set 110, in accordance with one embodiment of the present invention. At step 402, the filtered data set is analyzed to identify supporting and non-supporting features. The supporting features are structural and textual features that contain information corresponding to the pre-defined context. For example, if the pre-defined context relates to the purchase of shoes, information such as shoe brand, or the address of a shoe retailer, would be considered as a supporting feature.

The supporting features in the filtered data set are identified by matching the content of the filtered data set with the features that relate to the attributes that define the pre-defined context. For example, for a pre-defined context of show tickets, the features that are known to relate to the attributes of the context are concert, pop-star names etc. Hence, any reference to a concert or a pop-star name in the filtered data set would be identified as a supporting feature.

The non-supporting features are structural and/or textual features that do not contain information corresponding to the pre-defined context. For example, in the case of online purchase of shoes, information such as annual production of shoes of a particular brand would be considered as a non-supporting feature, since this information does not relate to the attributes that define the pre-defined context.

At step 404, each supporting and non-supporting feature identified is assigned a positive and a negative weight respectively. A supporting feature is assigned a positive weight based on the extent to which it is relevant to the pre-defined context. For example, if the pre-defined context relates to the purchase of shoes, then a supporting feature listing shoe prices would be given a higher weight than a feature describing the manufacturing process of shoes. A non-supporting feature is assigned a negative weight based on the extent by which it digresses from the pre-defined context.

The weights are assigned based on the importance of the attribute in the definition of the pre-defined context. For example, in case the pre-defined context is the online purchase of shoes, the attribute 'shoe brand' would be more critical to the definition of the pre-defined context (online purchase of shoes) than an attribute like 'process used in the manufacture of the shoe'. Hence, different attributes will be associated with different weights in the definition of the pre-defined context. These weights are then used to assign weights to the supporting and non-supporting features associated with the attributes.

At step 406, a confidence value is calculated for the filtered data set. The confidence value is a mathematical function of the positive and negative weights assigned to the supporting and non-supporting features of the filtered data set respectively. The confidence value is used as a measure of the relevance of the filtered data set with respect to the pre-defined context. An appropriate mathematical function to determine the confidence value is defined such that the positive and the negative weights have an impact in opposite directions on the confidence value. In this function, the degree of impact of a weight on the confidence value also depends on the magnitude of the weight. An example of a function for calculating the confidence value is a summation of the positive and negative weights.

At step 408, the confidence value of the filtered data set is compared with a threshold confidence value. The filtered data set is considered relevant if the confidence value is greater than the threshold confidence value; otherwise it is considered non-relevant. The threshold confidence value is a pre-defined value that is decided based on the degree of strictness that is to be followed while selecting relevant data sets. It may differ based on the pre-defined context and the kind of mathematical function used for calculating the confidence value of the filtered data set. The filtered data set, which has been identified as relevant, is marked relevant and is sent for further processing. The filtered data set, which is identified as non-relevant, is rejected.

Figure 5:
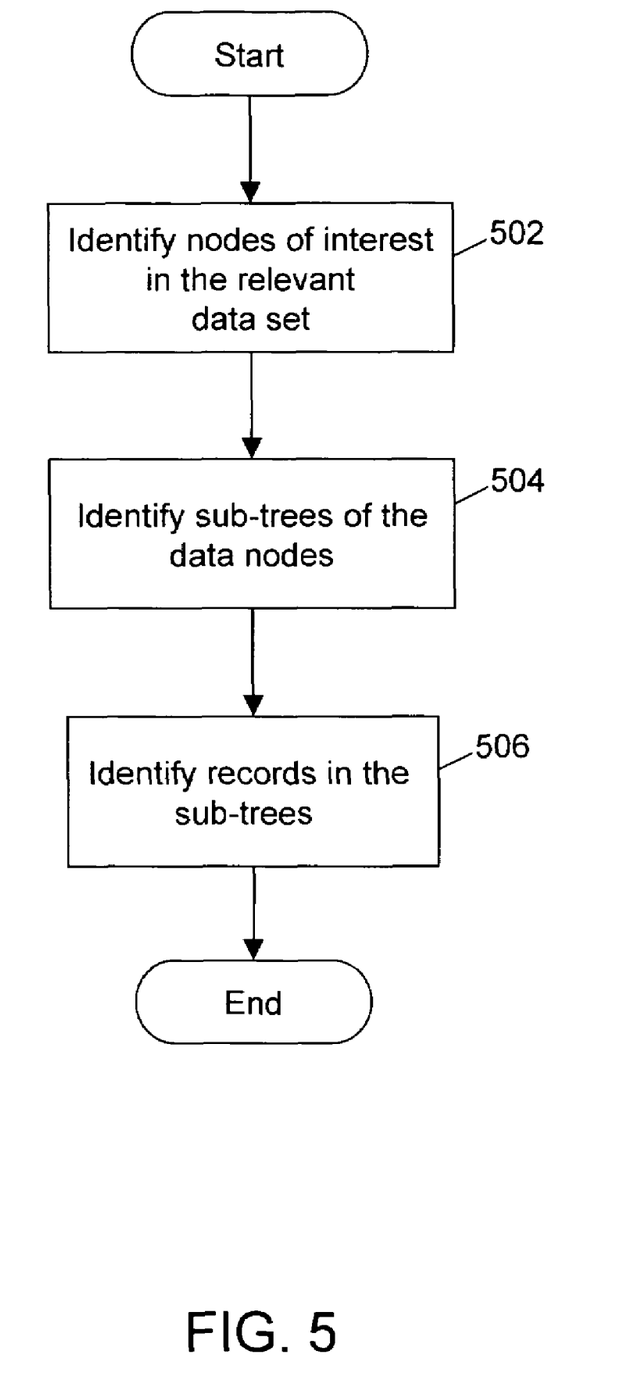
FIG. 5 is a flowchart illustrating the step of identifying relevant information from the relevant data set, in accordance with one embodiment of the present invention.

FIG. 5 is a flowchart that illustrates the step of identifying relevant information in the relevant data set. At step 502, nodes of interest in the relevant data set are identified. The nodes of interest are sections of the relevant data set that contain data values of one or more attributes corresponding to the pre-defined context. For example, if the pre-defined context relates to the online purchase of shoes with price as an attribute, then a text section which mentions price value for a shoe model, is identified as a node of interest in the relevant filtered data set.

At step 504, sub-trees of the nodes of interest are identified for each relevant data set. A sub-tree is a hierarchical structural arrangement of information that shows the relationship of the nodes of interest with their ancestor nodes. In order to identify the sub-trees, corresponding to each node of interest, an upward path from the node of interest is constructed. The upward paths identified are the sub-trees associated with the nodes of interest. For example, a webpage written in an XML or HTML format comprises information arranged in a tree structure. In order to identify the sub-trees, corresponding to each node of interest in the webpage, an upward path from the node of interest to the root node in the XML or HTML structure is constructed. The upward paths identified are the sub-trees associated with the nodes of interest.

At step 506, records corresponding to the nodes of interest in the sub-tree are identified. Each record is a group of nodes and contains information, which is relevant to a pre-defined context. For example, the record is a part of the sub-tree that contains at least one node of interest and other sub-tree nodes that support the information given in the node of interest. The process of identification of the records of information is referred as recordification.

In accordance with one embodiment of the invention, the information from an unstructured data set 114 is extracted in the similar manner as that from semi-structured data set 112. However, in the case of unstructured data set 114, the process of recordification is not carried out, and information is extracted directly from unstructured data sets 114.

The details of the method of identifying records (or the process of recordification) are given in U.S. Provisional Patent Application No. 60/643,948 filed on Jan. 14, 2005 filed on Jan. 14, 2005, titled "Method and system to identify records that relate to a pre-defined context in a data set", which has been incorporated by reference herein.

Figure 6:
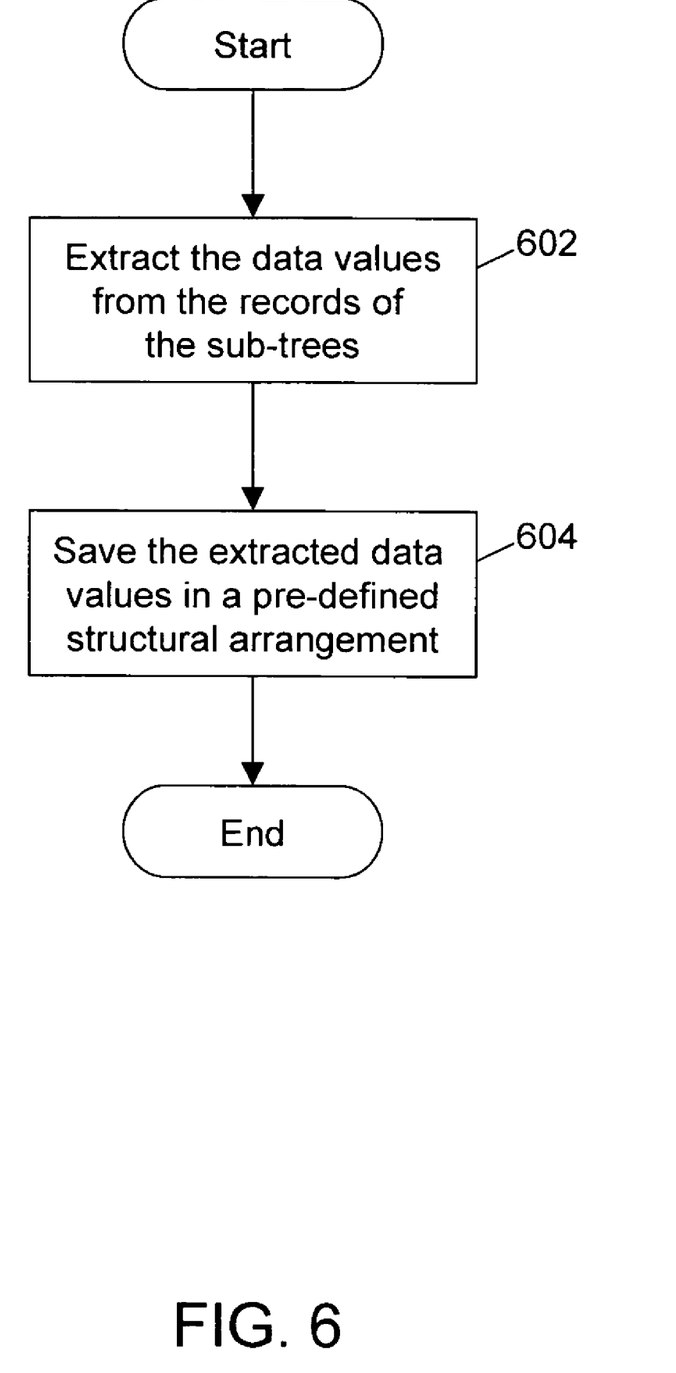
FIG. 6 is a flowchart illustrating the step of extracting data values from the records, in accordance with one embodiment of the present invention.

FIG. 6 is a flowchart that illustrates the step of extracting data values from the records. At step 602, the data values in the nodes of the records are correlated with the attributes of the pre-defined context to which they correspond. At step 604, the correlated data values are extracted and arranged in a pre-defined data structure. The pre-defined data structure is a structural arrangement that defines the relationships that exist between the attributes corresponding to the pre-defined context. The data values arranged in the pre-defined data structure are stored in database 106. An example of the pre-defined data structure is a Directed Acyclic Graph (DAG).

In one embodiment of the invention, the extracted data values are sanitized based on the existing knowledge, which is obtained from an authorized source of information. The process of sanitizing implies adding or deleting information from the extracted data values such that the extracted data values are consistent with the existing knowledge from an authorized source.

For example, the advertisement of a Madonna concert on Dec. 25, 2005 at Staples Centre can be construed as existing knowledge from an authorized source of information. Further, if data values extracted from a webpage state that a Madonna concert is scheduled on Dec. 25, 2005, then by comparing the extracted data values with the knowledge from the advertisement, the venue of the concert, namely, Staple Centre will be added to the data values in the pre-defined data structure.

Similarly, some of the extracted data values may be deleted after comparison with the existing knowledge from an authorized source, to make the extracted values more accurate. For example, if an extracted data value pertains to a ticket for a game of a triangular tournament between Team A, Team B and Team C and the date for the game is Jan. 30, 2005; and from the existing knowledge from an authorized source, it is known that Team A will play Team B on Jan. 30, 2005. Therefore, information about Team C playing on Jan. 30, 2005 will be deleted to get a more accurate extracted value.

Figure 7:
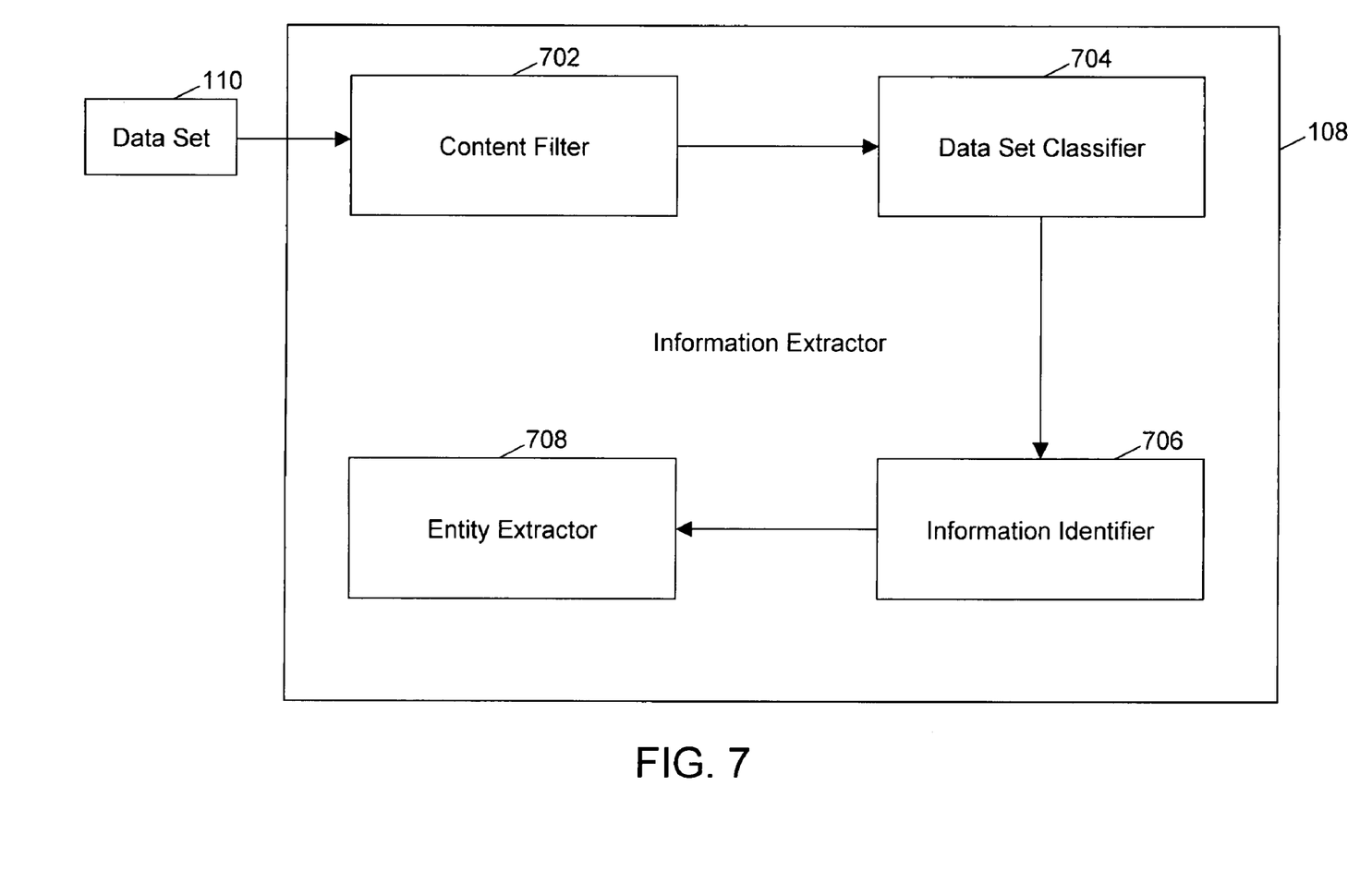
FIG. 7 is a block diagram illustrating the system elements of the present invention, in accordance with one embodiment of the present invention.

FIG. 7 is a block diagram illustrating the system elements of the present invention. Information extractor 108 comprises a content filter 702, a data set classifier 704, an information identifier 706 and an entity extractor 708. Content filter 702 refines the information content of data set 110 by removing structural and/or textual data that may be identified as extraneous to the pre-defined context without reading their content. This is done by comparing data set 110 with pre-defined templates and eliminating the common textual and/or structural features. Content filter 702 is discussed in detail in conjunction with FIG. 8.

Data set classifier 704 identifies the relevance of data set 110 to the attributes corresponding to the pre-defined context. Data set classifier 704 is discussed in detail in conjunction with FIG. 9.

Information identifier 706 identifies the records of information in the relevant data set. Entity extractor 708 extracts the data values of one or more attributes corresponding to the pre-defined context from the records identified by information identifier 706. The system elements of information identifier 708 and entity extractor 710 are discussed in detail in conjunction with FIGS. 10 and 11.

Figure 8:
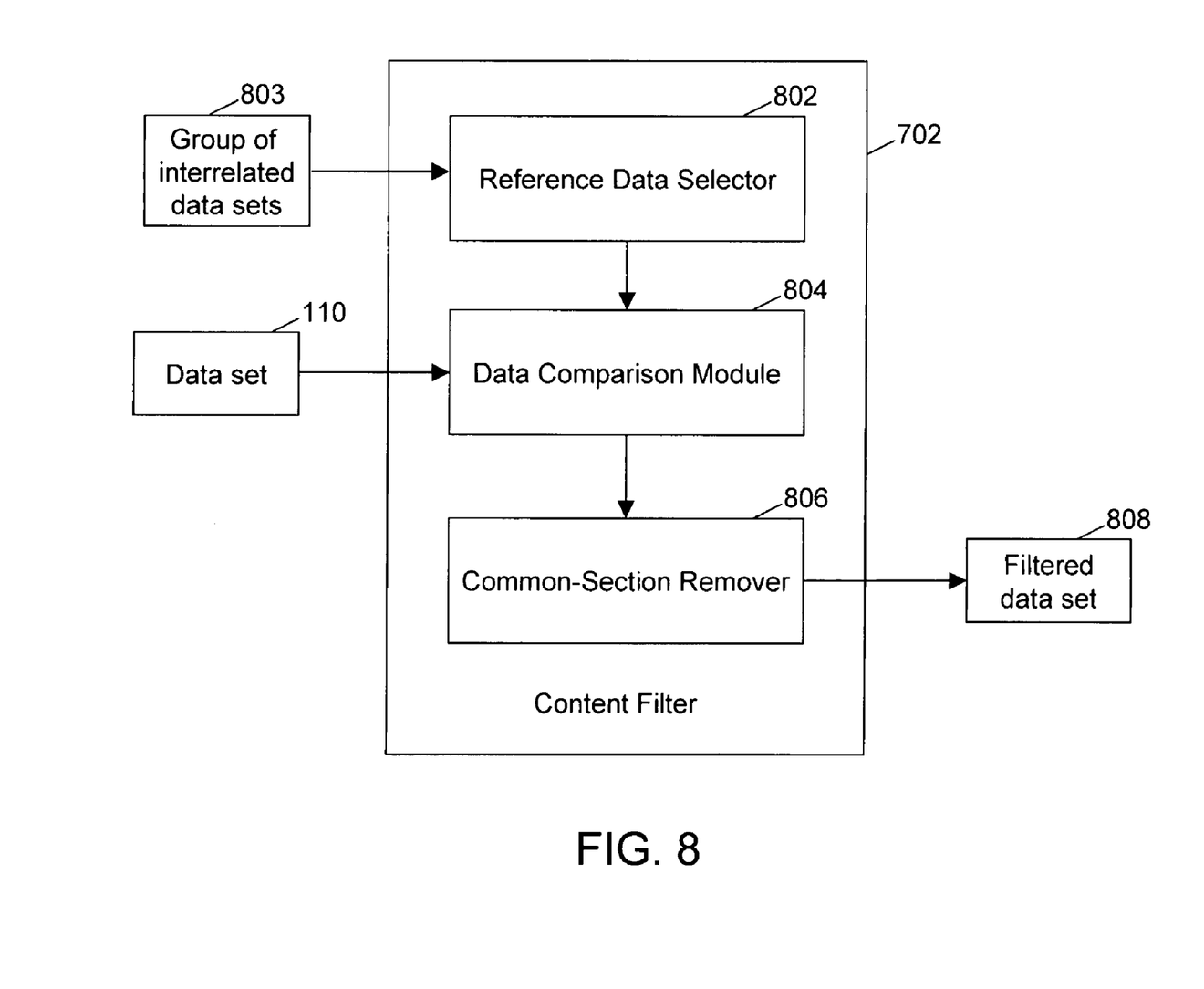
FIG. 8 is a block diagram illustrating the system elements of the content filter, in accordance with one embodiment of the present invention.

FIG. 8 is a block diagram illustrating the system elements of content filter 702 in accordance with one embodiment of the present invention. Content filter 702 comprises a reference data selector 802, a data comparison module 804, and a common-section remover 806. Reference data selector 802 selects a reference data set. The reference data set is a data set that contains structural and/or textual data that is common across a group of interrelated data sets 803. The interrelated data sets are the data sets that contain information about a single knowledge domain. The reference data set comprises features such as templates that may be classified as extraneous to the pre-defined context without reading their content.

In one embodiment of the invention, where data sets 110 are webpages, the reference data set is selected by comparing the URL patterns of the webpages. The webpages with similar URL patterns are compared to identify the common structural and/or textual data, such as footer and navigation panel. Further, the webpage that contains such common structural and/or textual data is selected as the reference webpage.

Data comparison module 804 selects data set 110 and identifies the common structural and/or textual data between data set 110 and the reference data set. Common-section remover 806 removes the common structural and/or textual data from data set 110. For example, if data set 110 is a web page, the common structural and/or textual data can be the copyright information present in the footer of the web page.

In one embodiment of the present invention wherein data set 110 is a webpage, common-section remover 806 marks the HTML or XML tags of the webpage that are common with the reference page so that they are not read again when the webpage is processed further. In this manner, the irrelevant information is filtered from data set. Such data set from which irrelevant information has been removed is called a filtered data set 808.

Figure 9:
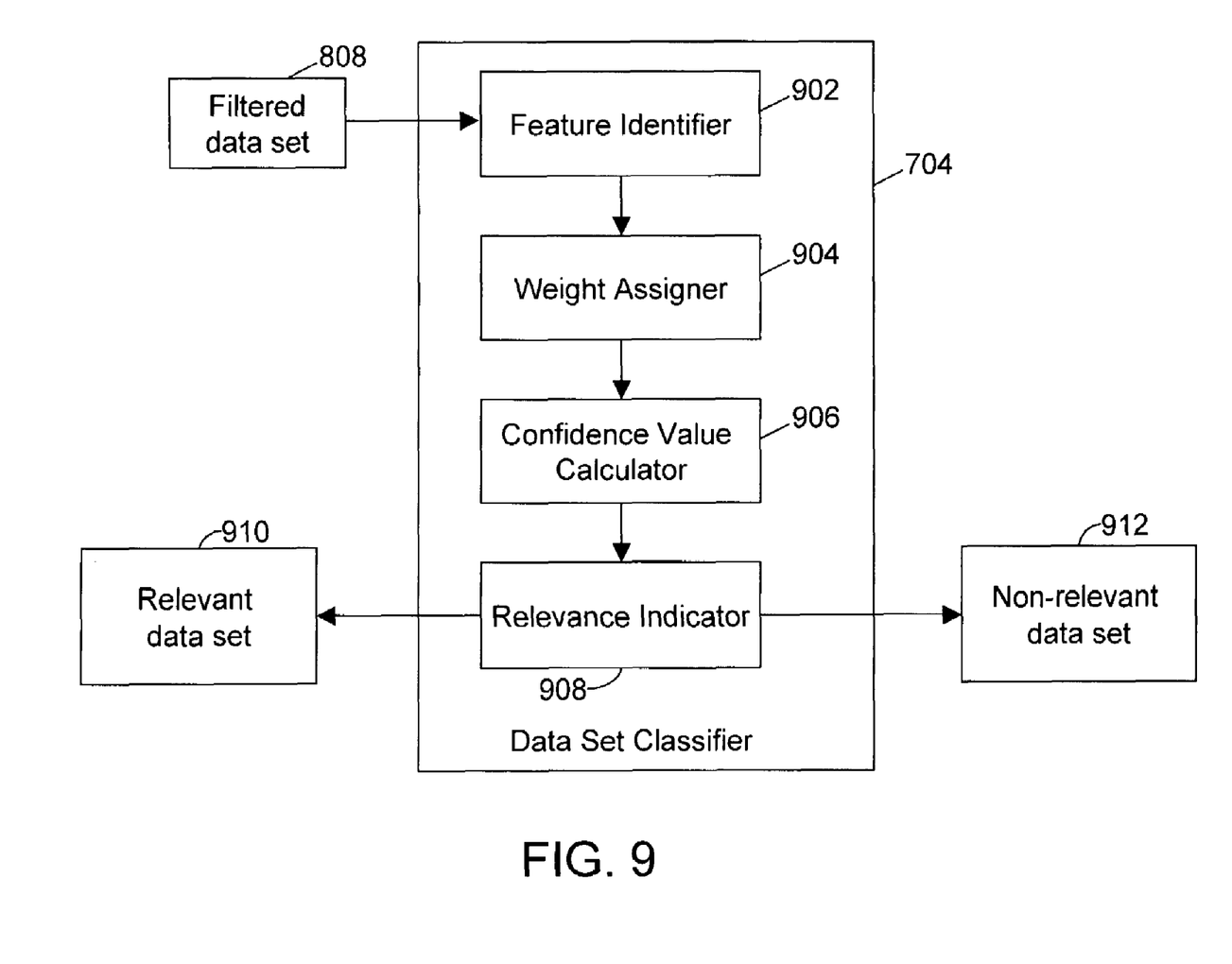
FIG. 9 is a block diagram illustrating the system elements of the data set classifier, in accordance with one embodiment of the present invention.

FIG. 9 is a block diagram illustrating the system elements of data set classifier 704 in accordance with one embodiment of the present invention. Data set classifier 704 comprises a feature identifier 902, a weight assigner 904, a confidence value calculator 906, and a relevance indicator 908. Feature identifier 902 identifies the supporting and non-supporting features of filtered data set 808. The supporting features are structural and/or textual features that contain information corresponding to the pre-defined context. For example, in case of online purchase of shoes, information such as brand of shoes and price of shoes would be considered as supporting features. The non-supporting features are structural and/or textual features that do not contain information corresponding to the pre-defined context. For example, in the case of online purchase of shoes, information such as annual production of shoes of a particular brand would be considered as a non-supporting feature.

Feature identifier 902 identifies the supporting features in filtered data set 808 by matching the content of filtered data set 808 with the features that relate to the pre-defined context. For example, if the pre-defined context is related to purchase of shoes, feature identifier 902 would already have a feature store that stores names such as Reebok®, Nike®. Feature identifier 902 therefore would recognize any occurrence of such names in filtered data set 808 and identify the sections that contain them as supporting features.

Weight assigner 904 assigns positive and negative weights to each supporting and non-supporting feature of filtered data set 808 respectively. The positive weight is a positive numerical value that is calculated based on the degree of relevance of the supporting feature to the pre-defined context. The negative weight is a negative numerical value that is calculated based on the degree of digression of the non-supporting feature from the pre-defined context.

Confidence value calculator 906 calculates a confidence value of filtered data set 808. The confidence value is a numerical value that is used as a measure of the relevance of data set 110 to the pre-defined context. Confidence value calculator 906 calculates the confidence value as a mathematical function of the weights of each supporting and non-supporting feature. Confidence value calculator 906 sends the confidence value of filtered data set 808 to relevance indicator 908.

Relevance indicator 908 compares the confidence value of filtered data set 808 with a threshold confidence value. If the confidence value is greater than the threshold confidence value, filtered data set 808 is considered relevant data set 910; otherwise, the filtered data set 808 is considered as non-relevant data set 912. Relevant data set 910 is selected for further processing and non-relevant data set 912 is rejected.

It will be apparent to a person skilled in the art that the threshold confidence value is a pre-defined value that decides the degree of strictness to be followed while selecting relevant data sets. It may differ based on the pre-defined context and the nature of mathematical function used for calculating the confidence value of filtered data set 808.

Figure 10:
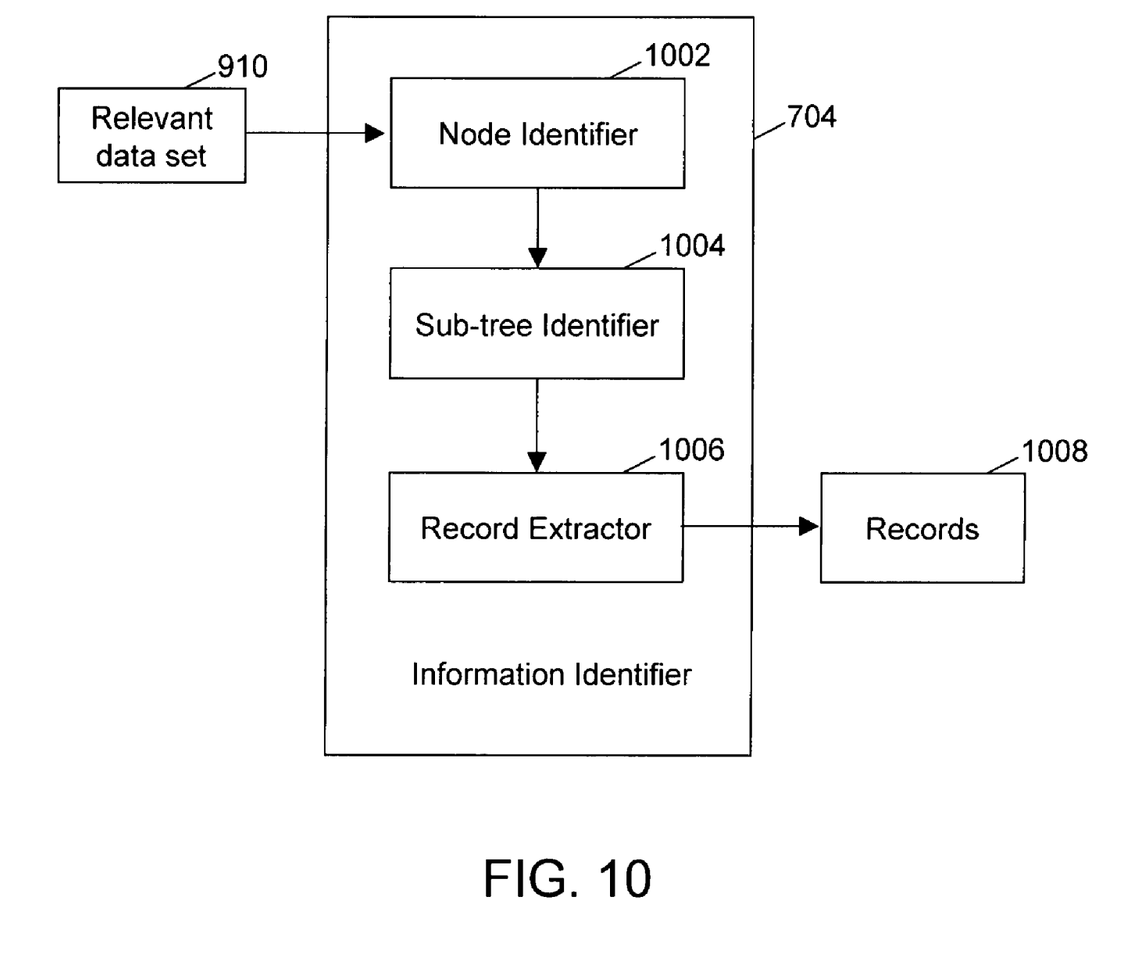
FIG. 10 is a block diagram illustrating the system elements of the information identifier, in accordance with one embodiment of the present invention.

FIG. 10 is a block diagram illustrating the system elements of information identifier 706 in accordance with one embodiment of the present invention. Information identifier 706 comprises a node identifier 1002, a sub-tree identifier 1004, and a record identifier 1006. Node identifier 1002 identifies nodes of interest in relevant data set 910. The nodes of interest are sections of the relevant data set 910 that contain data values for one or more attributes corresponding to the pre-defined context.

For example, a pre-defined context related to telephone number search would identify the sections (within relevant data set 910) that contain telephone numbers as nodes of interest. Sub-tree identifier 1004 identifies sub-trees for each node of interest in the relevant data set 910. The sub-tree is a hierarchical structural arrangement of information showing the relationship of the nodes of interest with their ancestor nodes. For each node of interest, sub-tree identifier 1004 constructs an entire upward path from the node of interest to identify the sub-tree associated with the node of interest.

Record identifier 1006 identifies records 1008 corresponding to the nodes of interest in the sub-tree identified. Record 1008 is a part of the sub-tree that contains at least one node of interest and other sub-tree nodes that support the information given in the node of interest.

Figure 11:
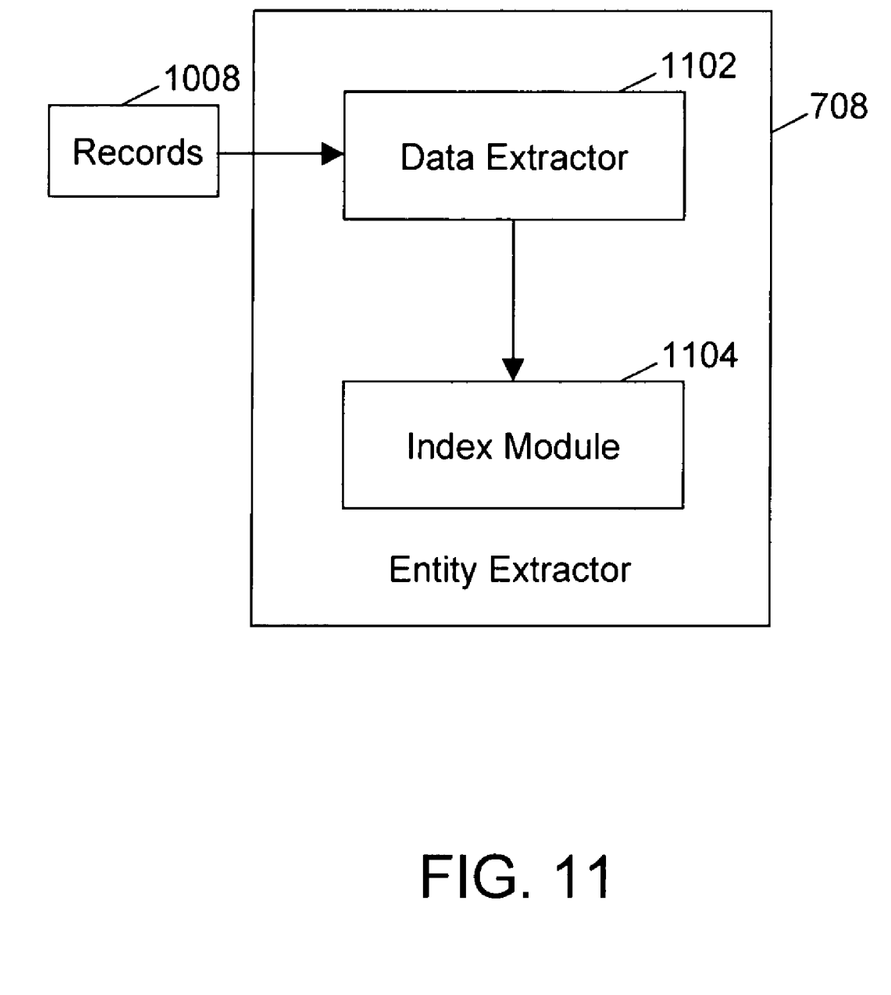
FIG. 11 is a block diagram illustrating the system elements of the entity extractor, in accordance with one embodiment of the present invention.

FIG. 11 is a block diagram that illustrates the system elements of entity extractor 708 in accordance with one embodiment of the present invention. Entity extractor 708 comprises a data extractor 1102 and an index module 1104. Data extractor 1102 extracts the values of the attributes that correspond to the pre-defined context. Data extractor 1102 extracts the values from the nodes of records 1008. Index module 1104 stores the extracted values in the form of a pre-defined data structure which logically links the attributes to each other, in accordance with their inter-relationships in the pre-defined context. An example of the pre-defined data structure is a Directed Acyclic Graph (DAG). Index module 1104 stores the data values arranged in the pre-defined data structure in database 106.

In one embodiment of the invention, data extractor 1102 sanitizes the extracted data values based on the existing knowledge, which is obtained from an authorized source of information. The process of sanitizing implies adding or deleting information from the extracted data values such that the extracted data values are consistent with the existing knowledge from an authorized source, as described earlier.

The pre-defined data structures in index module 1104 describe the relationships that exist between different attributes of the pre-defined context. Therefore, index module 1104 is an information store where information extracted from multiple sources is stored in a known structural arrangement. Such structural rearrangements allow operations like data object comparisons to be performed.

The method and system of the present invention extract information specific to a pre-defined context and store it in a structural form. The present invention can extract information from various sources of information and restructure it by correlating the information with the attributes corresponding to the pre-defined context. Thus, the information from varied sources, such as webpages, databases, and natural language texts are converted to a common pre-defined data structure. Based on this structure, operations like data object comparisons can be performed on the pre-defined data structures, in order to provide focused results to a user query.

The present invention can be implemented in a variety of languages such as Java, C++, Perl, Python, LISP, BASIC, assembly etc. The present invention can be implemented on platforms such as Windows®, Linux®, DOS® etc. However, it will be apparent to a person skilled in the art that the present invention can be implemented in other languages and platforms as well.

The system for extracting information, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device, which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program residing in a computer usable medium. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

While the preferred embodiments of the present invention have been illustrated and described, it will be clear that the invention is not limited to these embodiments only. Numerous modifications, changes, variations, substitutions and equivalents will be apparent to those skilled in the art without departing from the spirit and scope of the present invention as described in the claims.

What is claimed is:

1. A method for extracting information related to a pre-defined context from a group of data sets, the pre-defined context having a set of attributes that define the context, the method comprising the steps of:
    a) filtering the group of data sets to obtain one or more filtered data sets by removing irrelevant information, the irrelevant information being information that is not related to the set of attributes corresponding to the pre-defined context;
    b) identifying a relevant data set from a filtered data set of the one or more filtered data sets, the identification of the relevant data set being based on the occurrence of the set of attributes corresponding to the pre-defined context comprising:
        identifying supporting and non-supporting features in the filtered data set, the supporting features being structural or textual features that contain information corresponding to the pre-defined context, the non-supporting features being structural or textual features that do not contain information corresponding to the pre-defined context;

assigning a positive weight to each supporting feature in the filtered data set, the positive weight being a positive numerical value based on the degree of relevance of the supporting feature to the pre-defined context;

assigning a negative weight to each non-supporting feature in the filtered data set, the negative weight being a negative numerical value based on the degree of digression of the non-supporting feature from the pre-defined context;

calculating a confidence value for the filtered data set, the confidence value is a function of the positive and negative weights of the filtered data set, the confidence value being used as a measure to determine the relevance of the filtered data set to the pre-defined context; and selecting the relevant data set for further processing by comparing the confidence value of the filtered data set with a threshold confidence value, the selection being done by selecting the data set that has the confidence value greater than a pre-defined threshold confidence value;

c) identifying pertinent information from the relevant data set, the pertinent information being the information that contains values of the set of attributes corresponding to the pre-defined context;

d) extracting the values of the set of attributes from the pertinent information; and e) arranging the extracted values in the form of a pre-defined data structure which logically links the set of attributes to each other, in accordance with their inter-relationships as per the pre-defined context.

2. The method of claim 1, wherein the group of data sets is in an unstructured format, the unstructured format being a format in which the arrangement of data is not in accordance with a pre-defined data structure, the pre-defined data structure being a known manner of arranging data.

3. The method of claim 1, wherein the group of data sets is in a semi-structured format, the semi-structured format being a format in which the arrangement of data is in accordance with the pre-defined data structure.

4. The method of claim 1, wherein the step of filtering the group of data sets, comprises the steps of:
a) selecting a reference data set, the reference data set being a data set comprising structural and/or textual data that is common across a group of interrelated data sets;
b) comparing each data set of the group of data sets with the reference data set to identify the structural and/or textual data that is common between the data set and the reference data set; and
c) removing the common structural and/or textual data from the data set.

5. The method of claim 1, wherein the step of identifying the pertinent information from the relevant data set comprises the steps of:
a) identifying one or more nodes of interest in the relevant data set, each of the one or more nodes of interest comprising data that contains values of the set one or more of attributes corresponding to the pre-defined context;
b) identifying one or more sub-trees corresponding to each of the one or more nodes of interest, each of the one or more sub-trees being a hierarchical structural arrangement of information related to a node of interest in the relevant data set, wherein the hierarchical structural arrangement is one of an XML representation of the relevant data set arranged in a tree structure and an HTML representation of the relevant data set arranged in a tree structure; and
c) identifying one or more records corresponding to each of the one or more sub-trees, each of the one or more records being a part of the one or more sub-trees that contains at least one node of interest and other sub-tree nodes that contain values of the attributes corresponding to the pre-defined context.

6. A system comprising a processor for extracting information related to a predefined context from a group of data sets, the predefined context having a set of attributes that define the context, the system comprising:
a) a content filter for filtering the group of data sets by removing irrelevant information to obtain one or more filtered data sets, the irrelevant information being information that is not related to the set of attributes corresponding to the pre-defined context;
b) a data set classifier for identifying a relevant data set from a filtered data set of the one or more filtered data sets the identification of the relevant data set being based on the occurrence of the set of attributes corresponding to the pre-defined context the data set classifier comprising:
a feature identifier for identifying supporting and non-supporting features in the filtered data set, the supporting features being structural or textual information that contain information corresponding to the pre-defined context, the non-supporting features comprising information having structural or textual features not corresponding to the pre-defined context;
a weight assigner for assigning positive and negative weights to the identified supporting and non-supporting features respectively in the filtered data set, a positive weight being a positive numerical value based on relevance of a supporting feature to the pre-defined context and a negative weight being a negative numerical value based on digression of a non-supporting feature to the pre-defined context;
a confidence value calculator for calculating the confidence value of the filtered data set, the confidence value being a numerical value used as a measure to identify the relevance of the filtered data set to the pre-defined context; and
a relevance indicator for selecting the relevant data set for further processing by comparing the confidence value of the filtered data set with a threshold confidence value, the selection being done by selecting the data set that has the confidence value greater than a pre-defined threshold confidence value;
c) an information identifier for identifying pertinent information in the relevant data set, the pertinent information being the information that contains values of the set of attributes corresponding to the pre-defined context; and
d) an entity extractor for extracting the values of the set of attributes from the pertinent information.

7. The system of claim 6, wherein the group of data sets is in an unstructured format, the unstructured format being a format in which the arrangement of data is not in accordance with a pre-defined data structure, the pre-defined data structure being a known manner of arranging data.

8. The system of claim 6, wherein the group of data sets is in a semi-structured format, the semi-structured format being a format in which the arrangement of data is in accordance with the pre-defined data structure.

9. The system of claim 6, wherein the content filter comprises:
   a) a reference data selector, the reference data selector selecting a reference data set, the reference data set being a data set comprising structural and/or textual data that is common across a group of interrelated data sets;
   b) a data comparison module, the data comparison module comparing each data set of the group of data sets with the reference data set to identify the structural and/or textual data that is common between the data set and the reference data set; and
   c) a common-section remover, the common section remover removing the common structural and/or textual data from the data set.

10. The system of claim 6, wherein the information identifier comprises:
   a) a node identifier, the node identifier identifying one or more nodes of interest in the relevant data set, each of the one or more nodes of interest comprising data that contains values of the set of attributes;
   b) a sub-tree identifier, the sub-tree identifier identifying one or more sub-trees corresponding to each of the one or more nodes of interest, each of the one or more sub-trees being a hierarchical structural arrangement of information related to a node of interest in the relevant data set, wherein the hierarchical structural arrangement is one of an XML representation of the relevant data set arranged in a tree structure and an HTML representation of the relevant data set arranged in a tree structure; and
   c) a record identifier, the record identifier indentifying one or more records corresponding to each of one or more sub-trees, each of the one or more records being a part of the one or more sub-trees that contains at least one node of interest and other sub-tree nodes that contains value of the set of attributes corresponding to the pre-defined context.

11. The system according to claim 6, wherein the entity extractor comprises:
   a) a data extractor, the data extractor extracting the values of the set of attributes corresponding to the pre-defined context; and
   b) an index module, the index module storing extracted values in the form of a pre-defined data structure which logically links the set of attributes to each other, in accordance with their inter-relationships in the pre-defined context.

12. A computer program product for use with a computer, the computer program product comprising a computer storage medium having a computer readable program code embodied therein for extracting information related to a pre-defined context from a group of data sets, the pre-defined context comprising a set of attributes that define the context, the data set comprising structural and textual information, the computer program code performing the steps of:
   a) filtering the group of data sets to obtain one or more filtered data sets by removing irrelevant information, the irrelevant information being information that is not related to the set of attributes corresponding to the pre-defined context;
   b) identifying a relevant data set from a filtered data set of the one or more filtered data sets, the identification of the relevant data set being based on the occurrence of the set of attributes corresponding to the pre-defined context comprising:
      identifying supporting and non-supporting features in the filtered data set, the supporting features being structural or textual features that contain information corresponding to the pre-defined context, the non-supporting features being structural or textual features that do not contain information corresponding to the pre-defined context;
      assigning a positive weight to each supporting feature in the filtered data set, the positive weight being a positive numerical value based on the degree of relevance of the supporting feature to the pre-defined context;
      assigning a negative weight to each non-supporting feature in the filtered data set, the negative weight being a negative numerical value based on the degree of digression of the non-supporting feature from the pre-defined context;
      calculating a confidence value for the filtered data set, the confidence value is a function of the positive and negative weights of the filtered data set, the confidence value being used as a measure to determine the relevance of the filtered data set to the pre-defined context; and
      selecting the relevant data sets for further processing by comparing the confidence value of the filtered data set with a threshold confidence value, the selection being done by selecting the data set that has the confidence value greater than a pre-defined threshold confidence value;
   c) identifying pertinent information from the relevant data set, the pertinent information being the information that contains values of the set of attributes corresponding to the pre-defined context;
   d) extracting the values of the set of attributes from the pertinent information; and
   e) arranging the extracted values in the form of a pre-defined data structure which logically links the set of attributes to each other, in accordance with their inter-relationships as per the pre-defined context.

13. The method of claim 1 further comprising the step of sanitizing the extracted values, the sanitizing of the extracted values comprising the steps of:
   adding information to the extracted values based on an authorized source of information for making the extracted values and the authorized source of information consistent; and
   deleting information from the extracted values based on the authorized source of information for making the extracted values and the authorized source of information consistent.

* * * * *